May 26, 1925.

W. R. HANSON

EGG BEATING MACHINE

Filed May 10, 1924

1,539,731

W. R. Hanson
INVENTOR

BY Victor J. Evans
ATTORNEY

Patented May 26, 1925.

1,539,731

UNITED STATES PATENT OFFICE.

WALTER RUBEN HANSON, OF CHICAGO, ILLINOIS.

EGG-BEATING MACHINE.

Application filed May 10, 1924. Serial No. 712,289.

*To all whom it may concern:*

Be it known that I, WALTER RUBEN HANSON, a citizen of the United States, residing at Chicago, in the county of Cook and State of Illinois, have invented a new and useful Egg-Beating Machine, of which the following is a specification.

This invention relates to new and useful improvements in kitchen articles and more particularly to an egg beater. The main object of my invention is the provision of an article of the above character which includes a supporting frame having a rotatable shaft thereon manually rotated and having mounted upon the shaft a beater in the form of a substantially circular fan-like member, radial blades of which have their opposed longitudinal edges disposed alternately above and below the horizontal plane of the fan.

Another object of my invention is the provision of an egg beater of the above character incorporating a sleeve which is supported by the frame and surrounds the rotatable member, with a transverse bar extending against the central portion of one end of the sleeve and adapted to operate in conjunction with the blades of the fan for breaking up the eggs so as to thoroughly beat up both the yolks and the whites of the eggs either separately or together as may be desired.

Figure 1:
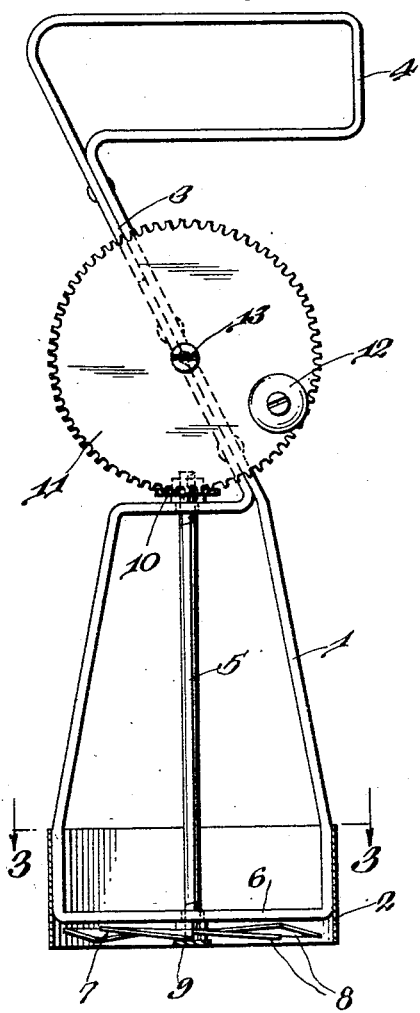
Figure 2:
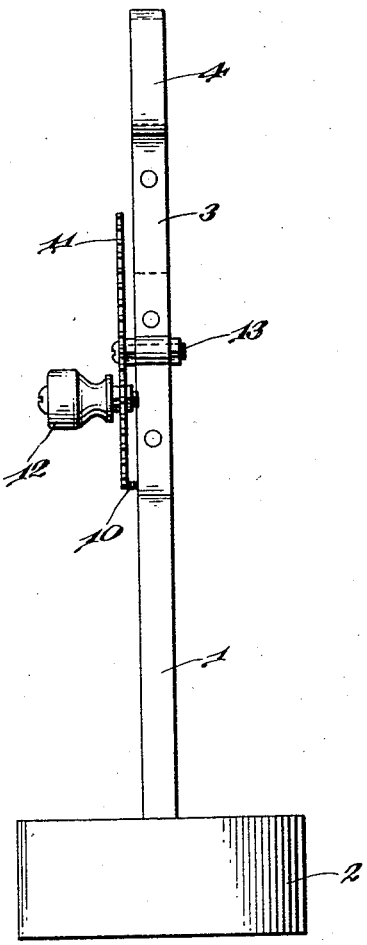
Figure 4:
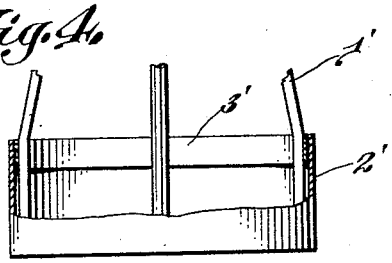
Figure 3:
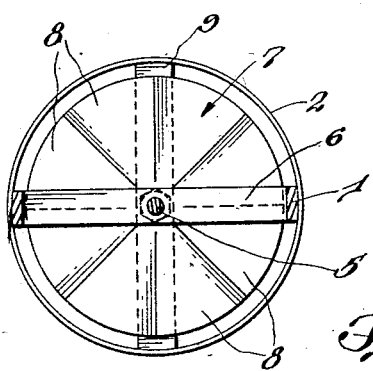

With the above and other objects in view, the invention consists in the novel features of construction, the combination and arrangement of parts hereinafter more fully set forth, pointed out in the claims and shown in the accompanying drawings, in which:

Fig. 1 is a side elevation of an egg beater constructed in accordance with my invention, parts of the same being broken away and illustrate the cross-section, Fig. 2 is an edge view taken at right-angles to the showing in Figure 1, Fig. 3 is a horizontal section on the line 3—3 of Figure 1, and Fig. 4 is a detail elevation of the embracing sleeve, parts of the same being broken away and showing the cross-section.

In carrying out my invention, I provide a supporting frame which comprises a metallic bar bent to provide a substantially rectangular body portion 1 and engaged over one end of the body portion is a sleeve 2 which incloses one end of the body as illustrated in the drawings.

Formed integral with the body 1 and extending obliquely from one corner thereof is a supporting arm 3, having at its upper end a substantially rectangular portion 4, forming a grip for supporting the egg beater in an operative position.

The ends of the body 1 are provided with suitable bearings adapted to receive the ends of a shaft 5 which is retained fitted in the bearings in any suitable manner and mounted upon the outer end of the shaft beyond the cross-bar 6, forming one end of the body 1 is a fan-like member 7 having the plurality of radial blades 8 disposed upon an angle with respect to the body of the fan-like member, whereby the edges of these blades will lie in a plane above and below the horizontal plane of the body of the fan providing cutting or beating edges which during the rapid rotation of the fan-like member will have a tendency to disintegrate the particles forming the eggs or other ingredients to be mixed or beaten. In order to carry out more thoroughly the beating of eggs or other articles, a cross-bar 9 is attached to the sleeve 2 and extended transversely against the outer end thereof at right-angles to the bar 6, whereby when the blades 8 pass beneath the bar 9 the parts of the articles being operated upon will have a tendency to come in contact with this bar and be thoroughly broken up. Upon the inner end of the shaft 5 is a pinion 10 which meshes with a gear 11, carrying a handle member 12 for manually rotating the gear. This gear is mounted upon a stub shaft 13 carried by the oblique arm 3 and so positioned that the teeth of the gear 11 will at all times engage the teeth of the pinion 10.

It will be apparent from the foregoing, that various ways may be utilized for beating eggs or mixing various ingredients, but in the beating of eggs it is preferred to drop the egg from the shell into the interior of the sleeve 2 upon the fan-like member 7, whereupon the rotation of the fan-like member will readily bring the edges of the blades 8 into contact with the egg, and through its rapid rotation beat the egg in a thorough manner.

While I have shown and described the preferred embodiment of my invention, it will be understood that various changes and alterations may be made without departing from the spirit of the invention or the scope of the appended claims.

In Fig. 4, I have illustrated a slightly modified form of the invention, wherein the sleeve 2' is detachably engaged with the body portion 1' by having the same threaded into the band 3' carried by the body frame. From this construction it will be apparent that the beater may be used either with or without the sleeve 2.

Having thus described my invention, what I claim is:

1. An egg beater including a substantially rectangular body frame, a substantially rectangular hand grip arranged in spaced relation with the body, an angular arm between the body and grip extending from one side of the body to the opposite side of the arm between said arm and body, a longitudinal shaft carried by the body, a pinion on one end and a rotatable gear supported by the arm and having engagement with the pinion.

2. An egg beater including a substantially rectangular body portion, a rectangular hand grip spaced from one end of the body, an angular arm connecting said body and hand grip, a rotatable shaft supported in the body, a fan-like member attached to one end of the shaft, a pinion on the other end of the shaft, a rotatable gear carried by the arm and meshing with the pinion and a sleeve embracing one end of the body with one edge extending beyond the edge of the body for enclosing the fan-like member.

WALTER RUBEN HANSON.